(12) United States Patent
Kalandyk et al.

(10) Patent No.: US 12,499,317 B2
(45) Date of Patent: Dec. 16, 2025

(54) CREATING DIALOGS FOR A PROBLEM-SOLUTION DATA SET

(71) Applicant: INTERNATIONAL BUSINESS MACHINES CORPORATION, Armonk, NY (US)

(72) Inventors: Piotr Kalandyk, Zielonki (PL); Hubert Kompanowski, Izbica Kujawska (PL); Grzegorz Piotr Szczepanik, Cracow (PL); Pawel Tadeusz Januszek, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 17/483,275

(22) Filed: Sep. 23, 2021

(65) Prior Publication Data

US 2023/0087571 A1    Mar. 23, 2023

(51) Int. Cl.
| | | |
|---|---|---|
| *G06F 40/20* | (2020.01) | |
| *G06F 16/3329* | (2025.01) | |
| *G06F 40/166* | (2020.01) | |
| *G06F 40/35* | (2020.01) | |
| *G10L 15/16* | (2006.01) | |

(52) U.S. Cl.
CPC .......... *G06F 40/35* (2020.01); *G06F 16/3329* (2019.01); *G06F 40/166* (2020.01); *G10L 15/16* (2013.01)

(58) Field of Classification Search
None
See application file for complete search history.

(56) References Cited

U.S. PATENT DOCUMENTS

| | | | |
|---|---|---|---|
| 9,338,493 B2 * | 5/2016 | Van Os | H04N 21/4828 |
| 9,734,208 B1 * | 8/2017 | Goldstein | G06F 16/24578 |
| 9,865,280 B2 * | 1/2018 | Sumner | G10L 25/48 |
| 10,382,367 B2 * | 8/2019 | Pappu | H04L 51/02 |
| 10,629,191 B1 | 4/2020 | Cheng | |
| 10,733,993 B2 * | 8/2020 | Kudurshian | G06F 16/685 |
| 10,978,056 B1 | 4/2021 | Challa | |
| 10,984,782 B2 | 4/2021 | Finkelstein | |
| 11,249,774 B2 | 2/2022 | Schissel | |

(Continued)

FOREIGN PATENT DOCUMENTS

CN    107133305 A    9/2017

OTHER PUBLICATIONS

"Enrichment of Knowledge Base of Conversational Agents by Active Question Targeting," [online] IP.Com Prior Art Database Technical Disclosure, No. IPCOM000250619D, Aug. 10, 2017, retrieved from the Internet: <https://ip.com/IPCOM/000250619>, 5 pg.

(Continued)

*Primary Examiner* — Seong-Ah A Shin
(74) *Attorney, Agent, or Firm* — Harrity & Harrity, LLP

(57) ABSTRACT

Metadata can be generated for documentation accessed from at least one knowledge source. Intents for main topics of the documentation can be generated using content structure information for the documentation. Dialogs for the intents can be generated. Sub-dialogs can be created for each of the dialogs based, at least in part, on the metadata for the documentation. The dialogs can be configured to be used to modify existing dialogs of a problem-solution data set.

20 Claims, 11 Drawing Sheets

(56) References Cited

U.S. PATENT DOCUMENTS

| | | | |
|---|---|---|---|
| 11,436,416 | B2 | 9/2022 | Beaver |
| 11,715,042 | B1 | 8/2023 | Liu |
| 11,972,331 | B2* | 4/2024 | Liden .................... G06F 3/0482 |
| 2015/0100943 | A1* | 4/2015 | Gabel .................... G06F 40/20 |
| | | | 717/106 |
| 2017/0358305 | A1* | 12/2017 | Kudurshian ............ G10L 13/02 |
| 2018/0097749 | A1 | 4/2018 | Ventura |
| 2019/0042988 | A1 | 2/2019 | Brown |
| 2019/0103095 | A1 | 4/2019 | Singaraju |
| 2019/0124020 | A1 | 4/2019 | Bobbarjung et al. |
| 2019/0182382 | A1 | 6/2019 | Mazza et al. |
| 2019/0377824 | A1 | 12/2019 | Wang et al. |
| 2020/0257857 | A1 | 8/2020 | Peper |
| 2020/0259891 | A1* | 8/2020 | Abraham ............ H04L 67/1008 |
| 2020/0342868 | A1 | 10/2020 | Lou |
| 2020/0395007 | A1 | 12/2020 | Cheng |
| 2021/0160373 | A1* | 5/2021 | Mcgann .............. H04M 3/5175 |
| 2021/0312304 | A1* | 10/2021 | Keena .................... G06N 20/00 |
| 2022/0165256 | A1 | 5/2022 | Maheswaran |
| 2022/0222424 | A1* | 7/2022 | Oleynik ................. H04L 51/02 |
| 2022/0237567 | A1* | 7/2022 | Tiwari ............... G06Q 10/1053 |
| 2022/0244925 | A1 | 8/2022 | Moss |
| 2023/0087896 | A1 | 3/2023 | Kalandyk et al. |
| 2023/0289167 | A1* | 9/2023 | Gangireddy ........... G06N 5/022 |
| 2024/0362019 | A1* | 10/2024 | El Hattami ......... G06F 16/3329 |

OTHER PUBLICATIONS

Zamora, F. et al., "How Citibot's chatbot search engine uses AI to find more answers," [online] Amazon, AWS Machine Learning Blog, Aug. 14, 2020, retrieved from the Internet: <https://aws.amazon.com/blogs/machine-learning/how-citibots-chatbot-search-engine-uses-ai-to-find-more-answers/>, 9 pg.
"How Knowledge Management Makes Chatbots Better," [online] Shelf, Chatbots Life, May 30, 2019, retrieved from the Internet: <https://chatbotslife.com/how-knowledge-management-makes-chatbots-better-562241438d81>, 5 pg.
Ait-Mlouk, A. et al., "KBot: A Knowledge Graph Based ChatBot for Natural Language Understanding Over Linked Data," IEEE Access, Aug. 12, 2020, vol. 8, pp. 149220-149230.
Shalaby, W. et al., "Building chatbots from large scale domain-specific knowledge bases: challenges and opportunities," In 2020 IEEE International Conference on Prognostics and Health Management (ICPHM), Jun. 8, 2020, pp. 1-8, IEEE.
"Automated Dialog creation through knowledge corpus analysis," [online] IP.com Prior Art Database Technical Disclosure, No. IPCOM000265136D, Mar. 2, 2021, retrieved from the Internet: <https://ip.com/IPCOM/000265136>, 3 pg.
"Method and Process for Dialog Composition from Documents," [online] IP.com Prior Art Database Technical Disclosure, No. IPCOM000263715D, Sep. 29, 2020, retrieved from the Internet: <https://ip.com/IPCOM000263715D>, pg.
IBM: List of IBM Patents or Patent Applications Treated as Related, Sep. 23, 2021, 2 pg.
Kalandyk, P. et al., "Leveraging Knowledge Records for Chatbot Local Search", U.S. Appl. No. 17/483,161, filed Sep. 23, 2021, 46 pages (not provided as this application is available to the Examiner.
Bosilijkov Markov "Content Mapping for Chatbots", Medium, Chatbots Magazine, Dec. 27, 2016, 13 pages, https://chatbotsmagazine.com/content-mapping-for-chatbots-cdb55dc51aa6.

* cited by examiner

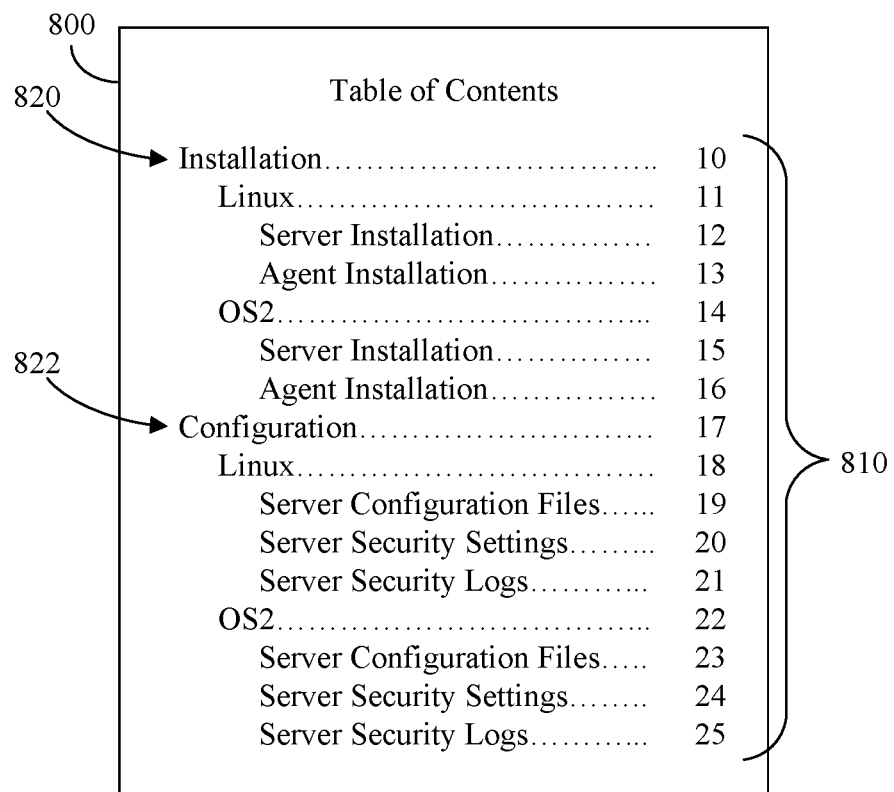
FIG. 8
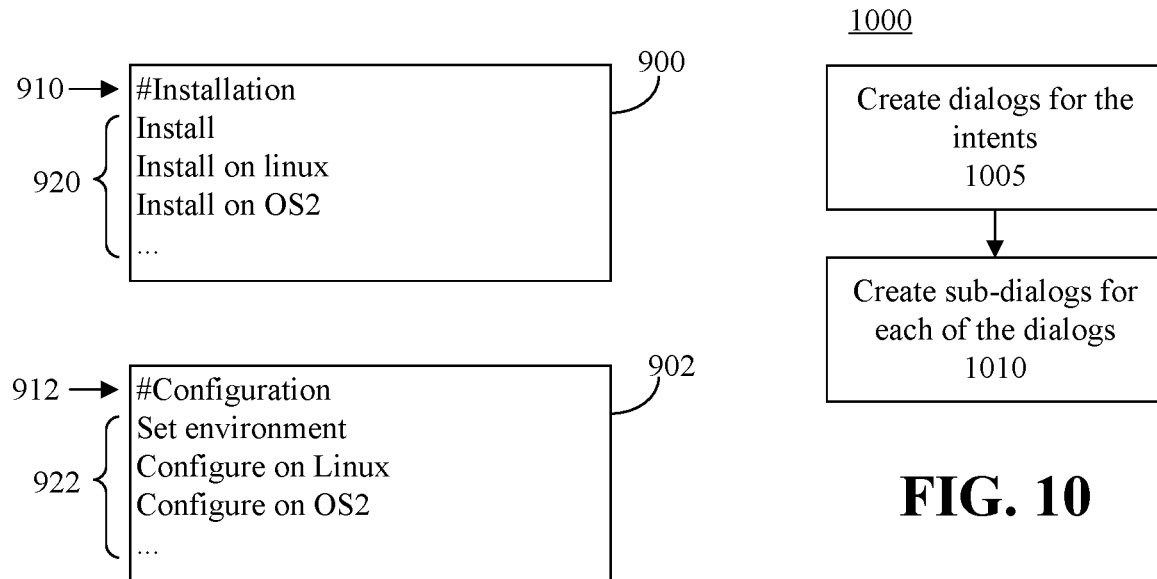
FIG. 9
FIG. 10

CREATING DIALOGS FOR A PROBLEM-SOLUTION DATA SET

BACKGROUND

The present invention relates to data processing system, and more specifically, to data processing systems that manage problem-solution data sets.

A chatbot is a computer program that simulates and processes human conversation, either written or spoken, allowing humans to interact with digital devices as if they were communicating with a real person. A chatbot processes data to deliver responses to requests for information. Chatbots increase operational efficiency and add cost savings to businesses while offering convenience and added services to internal employees and external customers. Chatbots allow companies to easily resolve various types of queries and issues while reducing the need for human interaction.

Chatbots use dialogs to converse with people. The quality of chatbot responses in conversations is dependent on the quality and thoroughness of the dialogs being used. It is not uncommon for dialogs to lack sufficient responses for various questions received during chatbot conversations. Moreover, people conversing with chatbots may repeatedly ask the same question in different ways in an attempt to get a satisfactory response from a chatbot. This can tie up valuable data processing resources and reduce the efficiency of data processing systems hosting chatbots.

SUMMARY

A method includes generating metadata for documentation accessed from at least one knowledge source. The method also can include generating, using a processor, intents for main topics of the documentation using content structure information for the documentation. The method also can include generating dialogs for the intents. The method also can include creating sub-dialogs for each of the dialogs based, at least in part, on the metadata for the documentation. The dialogs can be configured to be used to modify existing dialogs of a problem-solution data set.

In one or more arrangements, the method also can include identifying a first level of the content structure information as the main topics of the documentation. In one or more arrangements, the metadata generated from content on the respective pages of the documentation can be added to respective pages of the documentation.

In one or more arrangements, the method also can include creating examples for the intents, wherein the examples represent questions to which answers are to be provided by the sub-dialogs. The creating the sub-dialogs further can be based, at least in part, on the examples created for the intents. The sub-dialogs can specify as output the answers to the questions. At least a portion of the sub-dialogs further can specify conditions that provide context to the answers. The sub-dialogs can inherit conditions from sub-dialog groups to which the sub-dialogs are assigned.

A system includes a processor programmed to initiate executable operations. The executable operations include generating metadata for documentation accessed from at least one knowledge source. The executable operations also can include generating intents for main topics of the documentation using content structure information for the documentation. The executable operations also can include generating dialogs for the intents. The executable operations also can include creating sub-dialogs for each of the dialogs based, at least in part, on the metadata for the documentation. The dialogs can be configured to be used to modify existing dialogs of a problem-solution data set.

In one or more arrangements, the executable operations also can include identifying a first level of the content structure information as the main topics of the documentation. In one or more arrangements, the metadata generated from content on the respective pages of the documentation can be added to respective pages of the documentation.

In one or more arrangements, the executable operations also can include creating examples for the intents, wherein the examples represent questions to which answers are to be provided by the sub-dialogs. The creating the sub-dialogs further can be based, at least in part, on the examples created for the intents. The sub-dialogs can specify as output the answers to the questions. At least a portion of the sub-dialogs further can specify conditions that provide context to the answers. The sub-dialogs can inherit conditions from sub-dialog groups to which the sub-dialogs are assigned.

A computer program product includes a computer readable storage medium having program code stored thereon. The program code is executable by a data processing system to initiate operations. The operations include generating metadata for documentation accessed from at least one knowledge source. The operations also can include generating intents for main topics of the documentation using content structure information for the documentation. The operations also can include generating dialogs for the intents. The operations also can include creating sub-dialogs for each of the dialogs based, at least in part, on the metadata for the documentation. The dialogs can be configured to be used to modify existing dialogs of a problem-solution data set.

In one or more arrangements, the operations also can include identifying a first level of the content structure information as the main topics of the documentation. In one or more arrangements, the metadata generated from content on the respective pages of the documentation can be added to respective pages of the documentation.

In one or more arrangements, the operations also can include creating examples for the intents, wherein the examples represent questions to which answers are to be provided by the sub-dialogs. The creating the sub-dialogs further can be based, at least in part, on the examples created for the intents. The sub-dialogs can specify as output the answers to the questions. At least a portion of the sub-dialogs further can specify conditions that provide context to the answers. The sub-dialogs can inherit conditions from sub-dialog groups to which the sub-dialogs are assigned.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 8 depicts an example of content structure information for documentation.

FIG. 9 depicts examples of intent containers created for main dialogs contained in documentation.

FIG. 10 is a flowchart illustrating an example of a method of automatically generating conversation dialogs to add to a problem-solution data set or to modify a problem solution data set.

DETAILED DESCRIPTION

Figure 1:
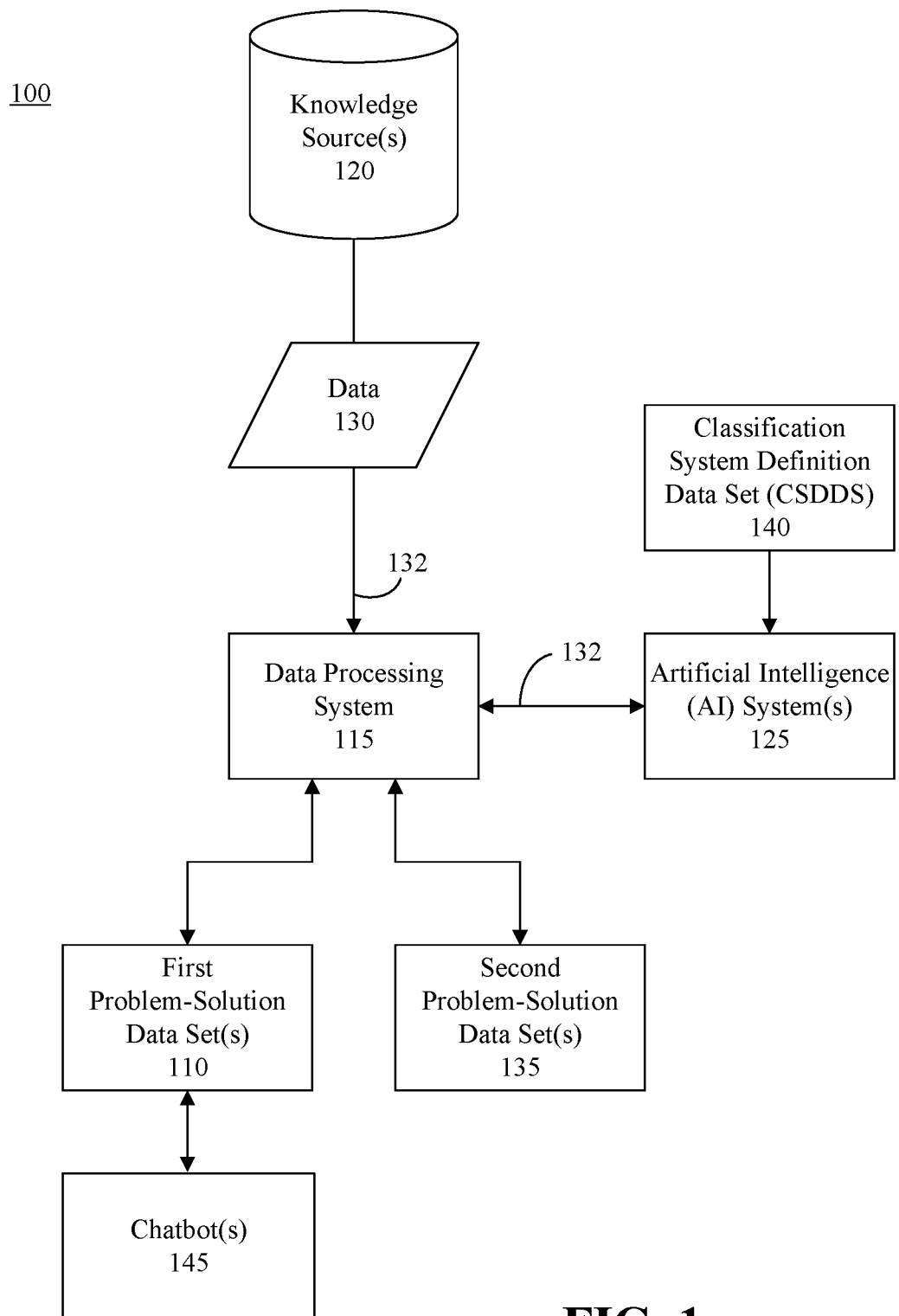
FIG. 1 is a block diagram illustrating an example of a computing environment for managing a problem-solution data set.

The arrangements described herein are directed to computer technology, and provide an improvement to computer technology. Specifically, the present arrangements improve computer technology in the computer technology field of managing problem-solution data sets, for example chatbot workspaces.

In accordance with the arrangements described herein, data from knowledge sources can be used to automatically create dialogs configured to be used to automatically modify existing dialogs of a problem-solution data set. Automatically modifying existing dialogs as described herein improves the accuracy of the existing dialogs for use by chatbots, thereby improving chatbot performance of a data processing system hosting a chatbot. Specifically, the arrangements described herein use artificial intelligence to identify intents and examples in the data obtained from the knowledge sources, and to automatically generate the dialogs using the identified intents and examples. The automatically generated dialogs are much more thorough than manually generated dialogs, thus improving responses to questions presented during chatbot conversations. This improvement expedites chatbot conversations, thus improving the efficiency of data processing systems hosting chatbots and reducing the use of data processing resources.

Several definitions that apply throughout this document now will be presented.

As defined herein, the term "chatbot" means a computer program configured to autonomously converse with users in a way that mimics human interaction. A chatbot may converse using text, or audio generated using text-to-speech synthesis, generated from dialogs.

As defined herein, the term "dialogue" means computer readable data, specifying at least intent, used by a chatbot to generate text to communicate with users using the text or audio generated from the text using text-to-speech synthesis. A dialogue also can specify an entity associated with the intent.

As defined herein, the term "intent" means data indicating an action intended to be performed.

As defined herein, the term "entity" means data indicating a thing on which, or for which, an action is intended to be performed.

As defined herein, the term "problem-solution data set" means a set of data indicating problems and solutions to those problems, the data being configured to be processed by a data processing system to determine solutions to determined problems.

As defined herein, the term "workspace" means a problem-solution data set comprising set of dialogs used by a chatbot to autonomously converse with users, each dialog specifying at least one intent and at least one of the dialogs further specifying an entity associated to the intent.

As defined herein, the term "document" means information stored in an electronic format and accessible via at least one communication network.

As defined herein, the term "knowledge source" means a source of data, wherein the data is a candidate to provide information for use by a data processing system to automatically generate dialogs.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a block diagram illustrating an example of a computing environment 100 for managing at least a first problem-solution data set 110, for example a chatbot workspace. The computing environment 100 can include at least one data processing system 115, one or more knowledge sources 120 and one or more artificial intelligence (AI) systems 125. In one or more arrangements, the computing environment 100 can include at least two knowledge sources 120. A knowledge source 120 can be, for example, a data repository that stores data 130 a in a digital format. The data 130 can include, for instance, documents. The knowledge source(s) can be components of the data processing system 115, components of other data processing systems, components of network attached storage devices, or any components of any other device(s) or system(s) suitable for providing at least one data repository. The AI system(s) 125 can be components of the data processing system 115 or components of another data processing system. An example of a suitable AI system 125 is IBM Watson®. For instance, the Data processing system 115 can interface with IBM Watson's conversation engine, which can perform AI processing at the behest of the data processing system 115.

The data processing system 115 can be communicatively linked to the knowledge source(s) 120 and the AI system(s) 125 via a communication network 132. The communication network 132 is the medium used to provide communications links between various devices and data processing systems connected together within the computing environment 100. The communication network 132 may include connections, such as wire, wireless communication links, or fiber optic cables. The communication network 132 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

As will be described in further detail, in operation, the data processing system 115 can automatically generate a second problem-solution data set 135, for example a second chatbot workspace, by processing the data 130 accessed by the data processing system 115 from the knowledge source(s) 120. The data processing system 115 can, using the AI system(s) 125, identify intents and entities indicated in the data 130, and generate dialogs corresponding to the intents and entities based on information provided in the data 130. The dialogs can be, for example, solutions to accomplish the intents for the entities. In illustration, assume an entity is a particular server operating system, and an intent for that entity is installing the operating system onto a computer. The dialog can include a link (e.g., a hyper link, a uniform resource locator (URL), a uniform resource identifier (URI), etc.) to instructions for installing that particular server operating system onto a computer, or the dialog can include step-by-step instructions for installing that particular server operating system onto a computer. To identify the intents and entities, and generate the dialog, the AI system(s) 125 can access a classification definition data set (CSDDS) 140 that defines a classification system. For example, the CSDDS 140 can include information indicative of a plurality of categories and/or sub-categories and relationships between the categories and/or sub-categories that define the classification system. In one or more arrangements, the CSDDS 140 can be an asset reuse manager (ARM) database.

Based on the second problem-solution data set 135, the data processing system 115 can automatically update the first problem-solution data set 110. Such updating can include, for example, adding and/or updating intents, adding and/or updating dialogs, adding and/or updating entities, etc. The first problem-solution data set 110 can be, for example, a chatbot workspace serving e as an input source for a chatbot 145. For example, the first problem-solution data set 110 can provide a set of conversations, with each conversation corresponding to at least one entity and at least one intent, used by the chatbot 145 to autonomously converse with users. The first problem-solution data set 110 and chatbot 145 can be managed, for example, using IBM Watson® Assistant.

At this point it should be noted that the computing environment 100 can include a plurality of first problem-solution data sets 110, a plurality of second problem-solution data sets 135 and/or a plurality of chatbots 145. In illustration, the computing environment 100 can include a plurality of chatbots 145, and for each of the plurality of chatbots 145, the computing environment 100 can include a respective first problem-solution data set 110. In one or more arrangements, the data processing system 115 can generate at least one second problem-solution data set 135 for one or more of the first problem-solution data sets 110. For example, the data processing system 115 can generate a plurality of second problem-solution data sets 135 for a particular first problem-solution data set 110, and automatically update that particular first problem-solution data set 110 based on the plurality of second problem-solution data sets 135 generated for that particular first problem-solution data set 110. Further, in one or more arrangements, the data processing system 115 can generate a respective second problem-solution data set 135 from each of a plurality of knowledge sources 120. For example, assume there are three knowledge sources 120 selected by the data processing system 115 for use in updating a particular first problem-solution data set 110. The data processing system 115 can generate a respective second problem-solution data set 135 from respective data 130 from each of the selected knowledge sources 120, and use those second problem-solution data sets 135 to update the particular first problem-solution data set 110, for example in a sequential order.

In one or more arrangements, the knowledge source(s) 120 used by the data processing system 115 to generate the second problem-solution data set(s) 135 can be specified by a user, such as a system developer. In one or more arrangements, the knowledge source(s) 120 used by the data processing system 115 to generate the second problem-solution data set(s) 135 can be automatically selected by the data processing system 115.

Figure 2:
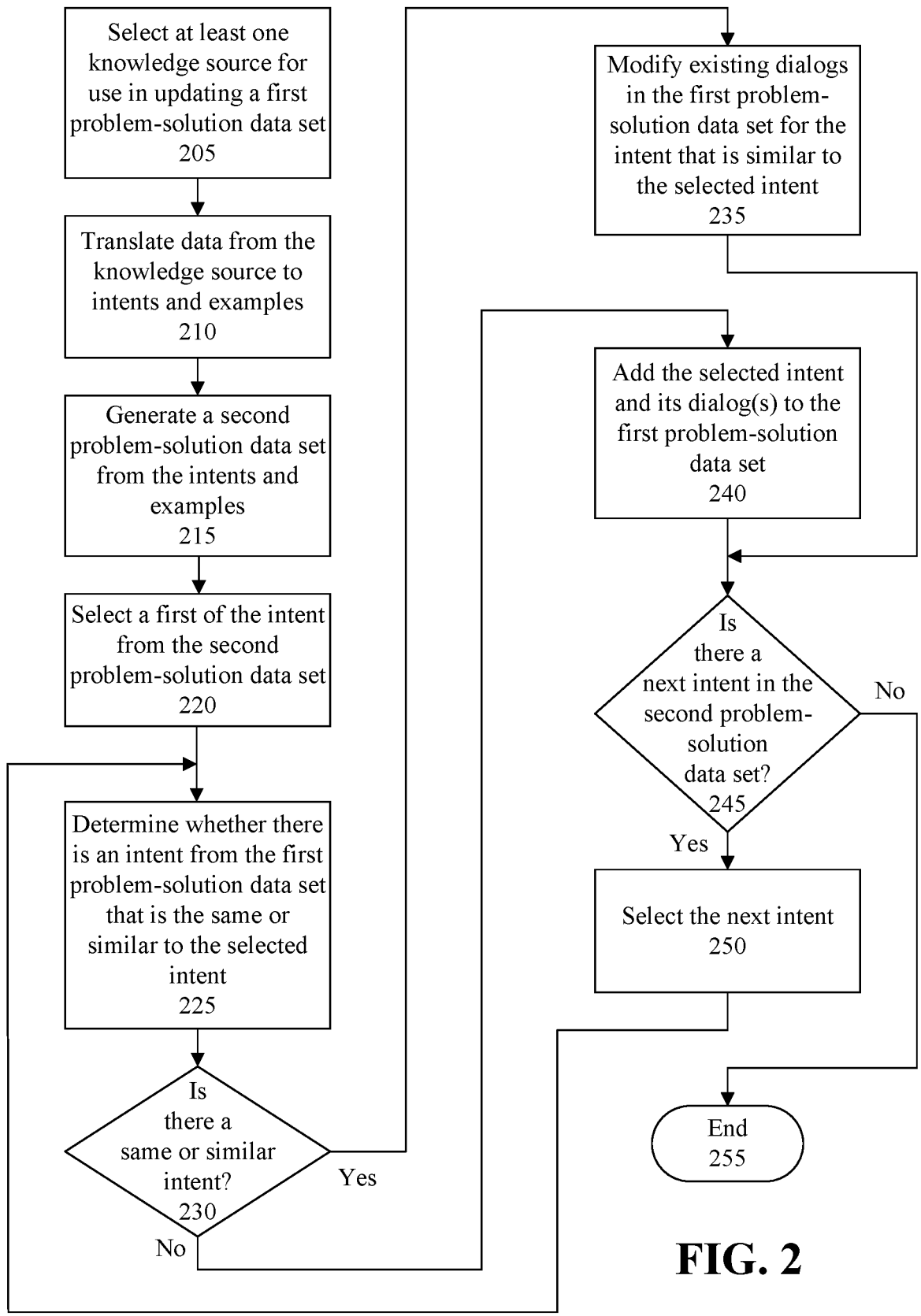
FIG. 2 is a flowchart illustrating an example of a method of managing a problem-solution data set.

FIG. 2 is a flowchart illustrating an example of a method 200 of managing a problem-solution data set, such as the first problem-solution data set 110. The method 200 can be implemented by the data processing system 115 of FIG. 1. The data processing system 115 can use the AI system(s) 125 (FIG. 1) to implement the method 200. Further, the data processing system 115 and/or AI system(s) 125 can access and use the CSDDS 140 (FIG. 1) to perform various steps described in the method 200.

Figure 3:
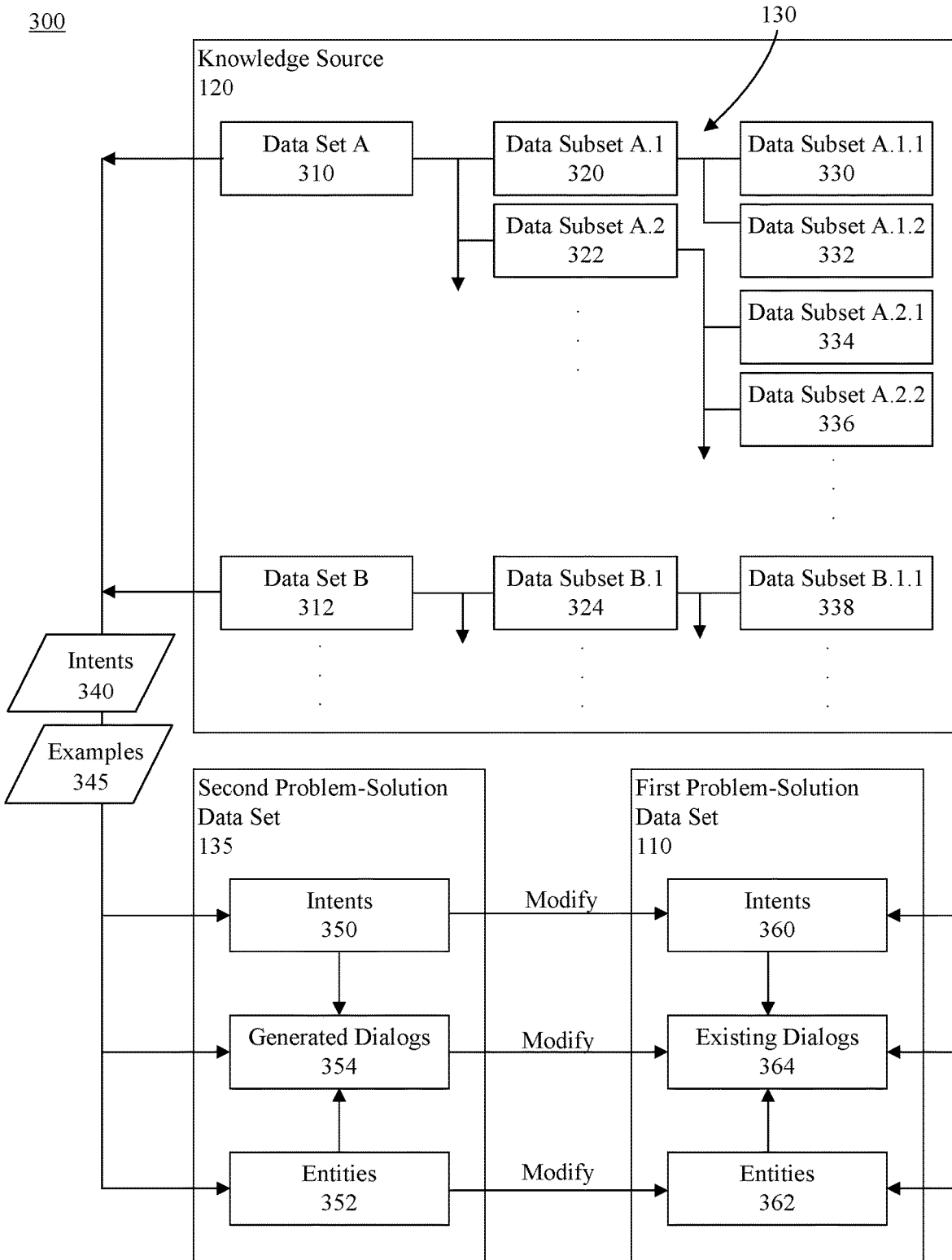
FIG. 3 is a block diagram illustrating use of data from a knowledge source for managing a problem-solution data set.

FIG. 3 is a block diagram illustrating use of data 130 from a knowledge source 120 to manage a problem-solution data set, such as the first problem-solution data set 110, for example as described by the method 200. Hereinafter reference will be made both to FIGS. 2 and 3 to facilitate understanding of the present arrangements.

At step 205 the data processing system 115 can select at least one knowledge source 120 for use in updating a first problem-solution data set 110. In illustration, the data processing system 115 can access data 130 from a plurality of knowledge source(s) 120. Using the AI system(s) 125, the data processing system 115 can analyze the data 130 using the CSDDS 140 to determine whether the data 130 from each knowledge source 120 includes entities and intents applicable to the first problem-solution data set 110. The data processing system 115 can select one or more knowledge sources 120 for which the respective data 130 includes entities and intents applicable to the first problem-solution data set 110.

The analyzing can include, for example, parsing text of the data 130, identifying entities and intents contained in the text, comparing the identified entities and intents to entities and intents specified in the CSDDS 140, and classifying the entities and intents contained in the text based on the comparison to the entities and intents specified in the CSDDS 140. The analyzing also can comprise scanning content structure information for knowledge sources 120, for example tables of content included in the data 130, and classifying entities and intents in the content structure information in a similar manner.

Classifying the entities and intents can include, for example, assigning the entities and intents to categories. In illustration, intents can be classified as "installation," "configuration," etc. Entities can be classified as, for example, "server," "agent," "settings," "security," "log files," a particular type of system (e.g., operating system), a particular version, and so on. The analyzing further can include assigning a relevance score to each knowledge source 120 based, at least in part, on the classification of the intents and entities. For example, the relevance score assigned to each knowledge source 120 can be determined based on a number of terms in the data 130 that are determined to be intents and entities, to which categories the terms are classified, and so on. In this regard, categories of intents and entities can be assigned weights, and terms identified as intents and entities can be assigned individual weighted scores according to the categories to which they are assigned. The relevancy score assigned to a knowledge source 120 can be determined, for instance, by summing the weighted scores of the intents and entities. The knowledge sources 120 that are selected can be those knowledge sources 120 having a relevancy score above a threshold value. The AI system(s) 125 can be trained, using machine learning, to identify intents and entities, and assign weights to the intents and entities.

In the example shown in FIG. 3, a knowledge source 120 that is selected can include one or more data sets 310, 312 from which data 130 is accessed. A data set 310, 312 can include, for example, a document providing information pertaining to a product. In illustration, a data set 310, 312 can be a technical document for a software product specifying installation procedures for various operating systems, configuration procedures, and so on.

Each data set 310, 312 can include data subsets. For example, a data set A 310 can include a data subset A.1 320 (e.g., installation procedures) and a data subset A.2 322 (e.g., configuration procedures). Each of the data subsets 320, 322 can include further subsets of data. For example, the data subset A.1 320 can include a data subset A.1.1 330, a data subset A.1.2 332, etc., and the data subset A.2 322 can include a data subset A.2.1 334, a data subset A.2.2 336, etc. In illustration, the data subset 330 can specify installation procedures for a product on a first operating system, the data subset 332 can specify installation procedures for the product on a second operating system, and so on. Similarly, the data subset 334 can specify configuration procedures for the product on the first operating system, the data subset 333 can specify configuration procedures for the product on the second operating system, and so on. The data set B 312 can be configured in a similar manner. For example, the data set B 312 can be directed to a different product than data set A 310, or directed to different types of procedures for the same product. The data set B 312 can include one or more data subsets, for example data subset B.1 324, data subset B.1.1. 338, etc.

At step 210 the data processing system 115, or the AI system(s) 125 at the behest of the data processing system 115, can automatically translate the data 130 from the selected knowledge source 120 to intents 340 and examples 345. In illustration, the AI system(s) 125 can parse terms, sentences, etc. from the data 130 and use the CSDDS 140 to identify those terms that represent intents and identify sentences in which those terms are used. The AI system(s) 125 can identify such sentences as examples. In illustration, consider the following categories of data 130:

$Install34AB: "install on Linux", "Deployment A12:23", "version 10" . . .

$UpgZZ01: "upgrade—version X", "Upgrade DB2", "New features" . . .

$DecomW01: "Decommission—version X", "Remove DB2", "Deinstall from OS2" . . .

From this data 130 the AI system(s) 125 can identify intents 340 "install," "upgrade" and "decommission." Further, the AI system(s) 125 can identify different terms that represent the same intent 340 and categorize such terms into the intent 340 they represent. In illustration, the terms "install," "deployment" and "version" each can represent an intent 340 to perform an installation of a product, and can be assigned to an install dialog category "$Install34AB." Similarly, the terms "upgrade" and "new features" can represent an intent 340 to upgrade a product, and can be assigned to an upgrade dialog category $UpgZZ01." The terms "decommission," "remove" and "deinstall" can represent an intent 340 to decommission a product, and can be assigned to a decommission dialog category $DecomW01."

Further, the AI system(s) 125 can identify "install on Linux," "Deployment A12:23" and "version 10" as examples 345 for the intent 340 "install," identify "upgrade—version X," "Upgrade DB2" and "New features" as examples 345 for the intent 340 "upgrade," and identify "Decommission—version X," "Remove DB2" and "Deinstall from OS" as examples 345 for the intent 340 "decommission."

At step 215 the data processing system 115 can automatically generate a second problem-solution data set 135 from the intents 340 and examples 345. The second problem-solution data set 135 can include intents 350, which correspond to the intents 340, entities 352 and generated dialogs 354. In illustration, the data processing system 115 can add the identified intents 340 to the second problem-solution data set 135 as intents 350. Further, from the identified examples 345, the data processing system 115, or the AI system(s) 125 at the behest of the data processing system 115, can identify entities 352 specified in the examples 345. For example, the AI system(s) 125 can parse the examples 345 and use the CSDDS 140 identify those terms that represent entities. The data processing system 115 can add the identified entities to the second problem-solution data set 135 as entities 352. Further, the AI system(s) 125 can assign the entities 352 to entity categories. In illustration, continuing with the previous example, the AI system(s) 125 can identify entities and assign those entities to entity categories as follows:

$ENT01: Linux, OS2

$ ENT02: system A $ ENT03: version 10, version X, DB2, new features

In this example, the AI system(s) 125 can determine that the entities "Linux" and "OS2" are a similar entity type and can assign them to an entity category "$ENT01." The AI system(s) 125 can assign the entity "system A" to an entity category "$ENT02." The AI system(s) 125 can determine that the entities "version 10," "version X," "DB2" and "new features" are a similar entity type and can assign them to an entity category "$ENT03."

Further, the data processing system 115, or the AI system(s) 125, can automatically generate dialogs 354 based on the identified examples 345, intents 350 and entities 352. The dialogs can be, for example, solutions (e.g., answers) to problems (e.g., problems to which questions are directed) pertaining to the intents 350 and entities 352. Further, the data processing system 115, or the AI system(s) 125 at the behest of the data processing system 115, can categorize the dialogs 354 into the dialog categories, wherein each dialog category represents a particular intent 350. For example, the dialogs 354 can be categorized as subsets of dialog data for each dialog category. In illustration, the AI system(s) 125 can generate dialogs for each dialog category, for example as follows:

Install-Dialog(D_$Install34AB)
        Sub-dialog(SD1_$Install34AB:$ENT01: Linux)→Answer: {Link to installation software on Linux}
        Sub-dialog(SD2_$Install34AB:$ENT02: OS2)→Answer: {Link to installation doc on OS2}
    Upgrade-Dialog(D_$UpgZZ01)
        Sub-dialog(SD1_$UpgZZ01:$ENT01: Linux)→Answer: {Link to upgrade software on Linux}
        Sub-dialog(SD2_$UpgZZ01:$ENT02: OS2)→Answer: {Link to upgrade software on OS2}
    Decommission-Dialog(D_$DecomW0)
        Sub-dialog(SD1_$DecomW01:$ENT01: Linux)→Answer: {Link to remove software on Linux}
        Sub-dialog(SD1_$DecomW01:$ENT02: OS2)→Answer: {Link to remove software on OS2}

In the above examples, the braces indicate links, such as hyperlinks, URIs and/or URLs.

At this point it should be noted that the intents 340, 350, entities 352 and generated dialogs 354 (including the dialog categories into which the dialogs 354 are categorized) are presented for purposes of example. The present arrangements are not limited to these specific examples. For example, in lieu of links, or in addition to links, one or more answers can contain text.

The first problem-solution data set 110 can include intents 360, entities 362 and existing dialogs 364. The intents 360 can be formatted in a manner similar to which the intents 350 are formatted, the entities 362 can be formatted in a manner similar to which the entities 352 are formatted, and the existing dialogs 364 can be formatted in a manner similar to which the generated dialogs 354 are formatted. The first problem-solution data set 110 need not be automatically generated. For example, one or more system developers can generate the first problem-solution data set 110. Nonetheless, the present arrangements are not limited in this regard. For example, the first problem-solution data set 110 can be a merged problem-solution data set in that contains manually generated intents, entities and existing dialogs, but previously was updated with automatically generated intents, entities and existing dialogs, for example as described herein.

At step 220 the data processing system 115, or the AI system(s) 125, can select a first intent 350 from the intents 350 of the second problem-solution data set 135. At step 225 the data processing system 115 can determine whether there is an intent 360 from the first problem-solution data set 110 that is similar to (or the same as) the selected intent 350 from the second problem-solution data set 135. The data processing system 115, or the AI system(s) 125, can determine whether there is an intent 360 from the first problem-solution data set 110 that is similar to (or the same as) the selected intent 350 using natural language processing (NLP) and semantic analysis, which are features of IBM Watson's conversation engine.

NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the data processing system 115, or the AI system(s) 125, to implement NLP and semantic analysis.

Referring to decision box 230, if there is an intent 360 from the first problem-solution data set 110 that is similar to (or the same as) the selected intent 350 from the second problem-solution data set 135, the process can proceed to step 235. At step 235, the data processing system 115, or the AI system(s) 125, can modify the existing dialogs 364 in the first problem-solution data set for the intent 360 that is similar to (or the same as) the selected intent 350. Modifying the existing dialogs 364 can include adding a new dialog to the existing dialogs 364 and/or changing a dialog already contained in the existing dialogs 364.

In illustration, assume that the existing dialogs 364 do not include the following dialog:
    Sub-dialog(SD1_$Install34AB:$ENT01: Linux)→Answer: {Link to installation software on Linux}

The AI system(s) 125 can add that dialog to the existing dialogs 364 and assign that dialog to a dialog category of the existing dialogs 364 that is similar to (or the same as) the dialog category "$Install34AB." By way of example, assume the existing dialogs 364 include a dialog category "$Install34A" that is similar to the dialog category "$Install34AB." In this example, the dialog can be added to the existing dialogs 364 as follows:
    Sub-dialog(SD1_$Install34A:$ENT01: Linux)→Answer: {Link to installation software on Linux}

In another example, if a similar dialog already exists in the existing dialogs 364, but lacks information presented in the dialog from the generated dialogs 354, that information can be added to the existing dialog. For example, assume an existing dialog 364 is as follows:
    Sub-dialog(SD1_$Install34A:$ENT01: Linux)→Answer: Perform the following steps: (a) . . . (b) . . . (c) . . .

That existing dialog 364 can be modified to replace the text "Perform the following steps: (a) . . . (b) . . . (c) . . . " with the {Link to installation software on Linux}, or the {Link to installation software on Linux} can be added to the existing dialog 364, for example before or after the text "Perform the following steps: (a) . . . (b) . . . (c) . . . "

In one or more arrangements, if the generated dialog 354 being added to the existing dialogs 364, or being used to modify an existing dialog 364, specifies an entity 352 that is not specified in the entities 362, the data processing system 115, or the AI system(s) 125, can modify the entities 362 by adding that entity 352 to the entities 362.

Referring again to decision box 230, if there is not an intent 360 in the first problem-solution data set 110 that is the similar to (or the same as) the intent selected from the intents 350 of the second problem-solution data set 135, at step 240 the data processing system 115, or the AI system(s) 125, can modify the intents 360 of the first problem-solution data set 110 by adding the selected intent 350 to the intents 360. Further, the data processing system 115, or the AI system(s) 125, can modify the existing dialogs 364 of the first problem-solution data set 110 by adding to the existing dialogs 364 the generated dialogs 354 assigned to the dialog category representing the selected intent 350.

The process can proceed from step 235 or step 240 to decision box 245. At decision box 245, the data processing system 115, or the AI system(s) 125, can determine whether there is a next intent 350 in the second problem-solution data set 135 that has not yet been selected. If so, at step 250 the data processing system 115 can select a next intent 350 that has not yet been selected from the second problem-solution data set 135. The process can return to step 225 and reiterate until there are no further intents 350 that have not already been selected during the present process. Responsive to the data processing system 115 determining that there are no further intents 350 that have not already been selected during the present process, the process can end at step 255.

Referring to FIG. 3, a system developer can provide further modifications 370 to the intents 360, entities 362 and dialogs 364 of the first problem-solution data set 110, for example to manually modify the first problem-solution data set 110.

Figure 4:
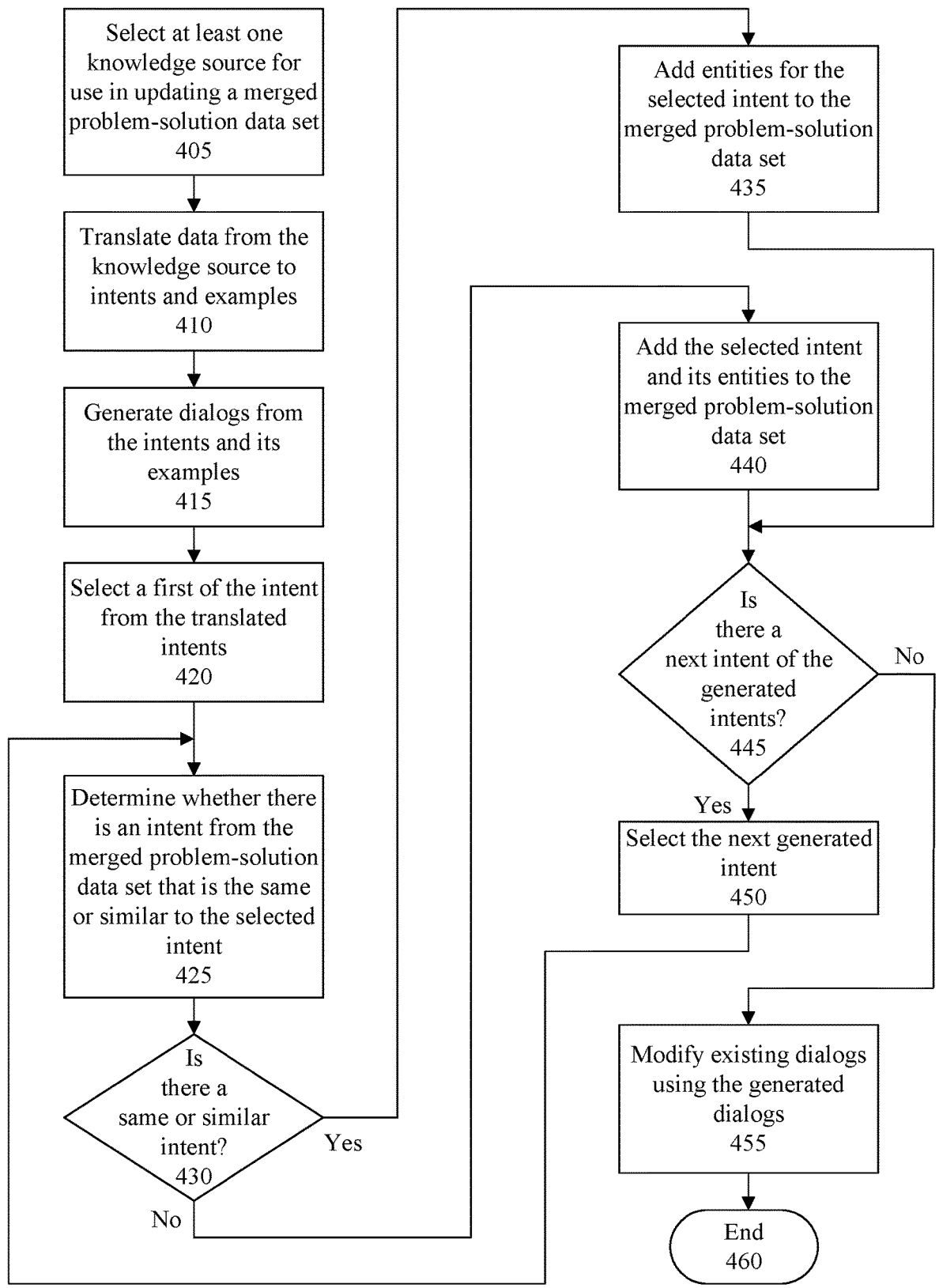
FIG. 4 is a flowchart illustrating an example of a method of managing a merged problem-solution data set.

FIG. 4 is a flowchart illustrating an example of a method 400 of managing a merged problem-solution data set. The method 400 can be implemented by the data processing system 115 of FIG. 1. The data processing system 115 can use the AI system(s) 125 (FIG. 1) to implement the method 400. Further, the data processing system 115 and/or AI system(s) 125 can access and use the CSDDS 140 (FIG. 1) to perform various steps described in the method 400.

Figure 5:
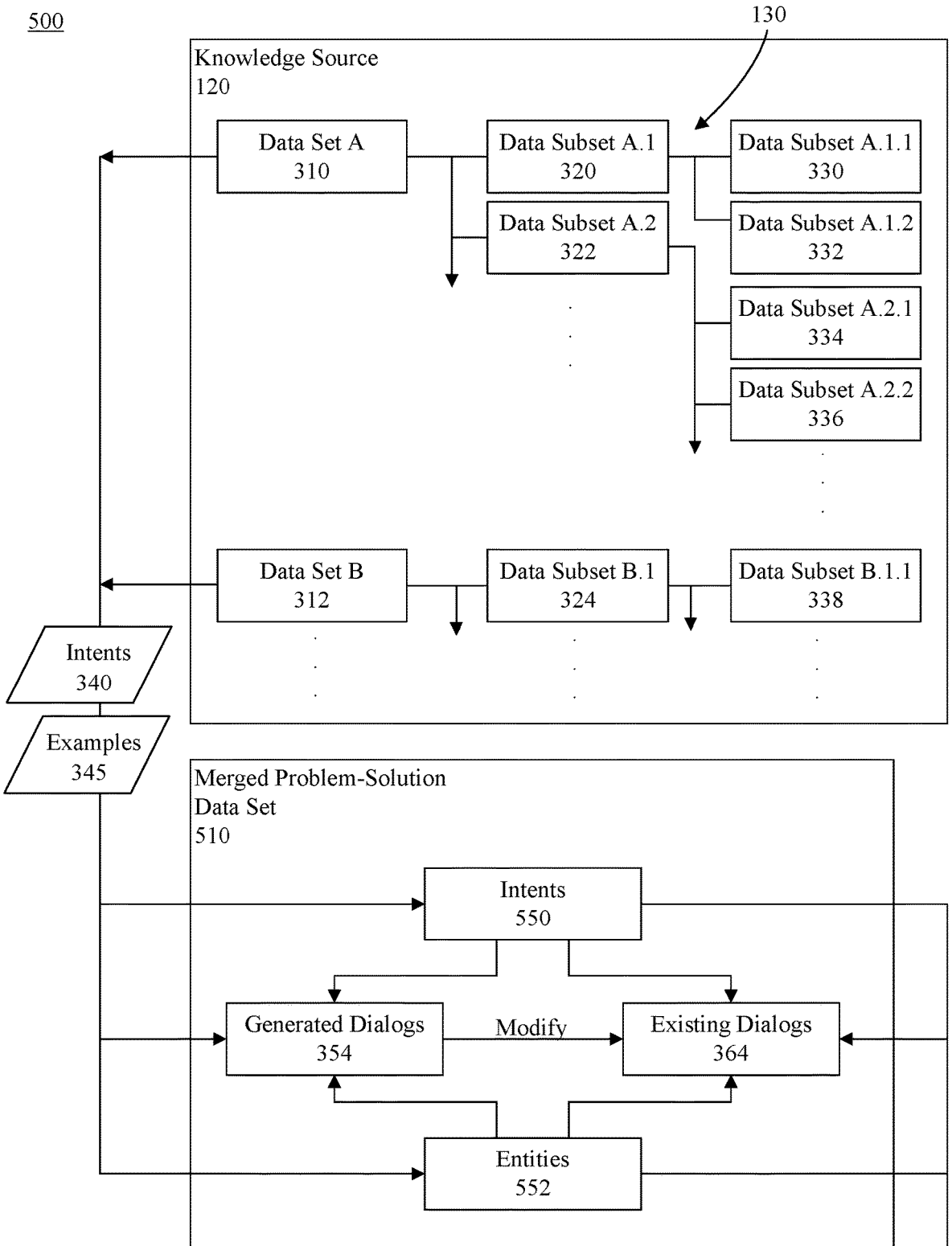
FIG. 5 is a block diagram illustrating use of data from a knowledge source for managing a problem-solution merged data set.

FIG. 5 is a block diagram illustrating use of data 130 from a knowledge source 120 to manage a merged problem-solution data set 510, for example as described by the method 400. Hereinafter reference will be made both to FIGS. 4 and 5 to facilitate understanding of the present arrangements.

The merged problem-solution data set 510 can include intents 550, entities 552 and existing dialogs 364. In one or more arrangements, initially, the intents 550, entities 552 and existing dialogs 364 can be copied to the merged problem-solution data set 510 from an existing problem-solution data set, for example the first problem-solution data set 110 (FIG. 1). In illustration, the intents 360 (FIG. 3) can be copied to the merged problem-solution data set 510 as intents 550, the entities 362 (FIG. 3) can be copied to the merged problem-solution data set 510 as entities 552, and the existing dialogs 364 can be copied to the merged problem-solution data set 510. In one or more other arrangements, an existing problem-solution data set, such as the first problem-solution data set 110, can be designated to be the merged problem-solution data set 510, in which case the intents 360 can be identified as intents 550 and the entities 362 can be identified as entities 552.

At step 405 the data processing system 115 can select at least one knowledge source 120 for use in updating a merged problem-solution data set 510. In the example shown in FIG. 5, the knowledge source 120 can include one or more data sets 310, 312 from which data 130 is accessed. A data set 310, 312 can include, for example, a document providing information pertaining to a product, for example as previously described with respect to step 205 of FIG. 2.

At step 410 the data processing system 115, or the AI system(s) 125 at the behest of the data processing system 115, can automatically translate the data 130 from the knowledge source 120 to intents 340 and examples 345, for example as described with respect to step 210 of FIG. 2.

At step 415 the data processing system 115, or the AI system(s) 125, can automatically generate one or more dialogs 354, for example as previously described with respect to step 215 of FIG. 2. The dialogs can be categorized into subsets of dialog data for each dialog category, wherein each dialog category represents a particular intent 350.

At step 420 the data processing system 115, or the AI system(s) 125, can select a first of the intents 340. At step 425, the data processing system 115, or the AI system(s) 125, can determine whether there is an intent 550 from the merged problem-solution data set 510 that is similar to (or the same as) the selected intent 340. The data processing system 115, or the AI system(s) 125, can determine whether there is an intent 550 from the merged problem-solution data set 510 that is similar to (or the same as) the selected intent 340 using natural language processing, which is a feature of IBM Watson's conversation engine.

Referring to decision box 430, if there is an intent 550 from the merged problem-solution data set 510 that is similar to (or the same as) the selected intent 340, the process can proceed to step 435. At step 435, the data processing system 115, or the AI system(s) 125, can automatically add, to the entities 552, one or more entities identified in the examples 345 corresponding to the selected intent 340 and that are not already contained in the entities 552 of the merged problem-solution data set 510. In one or more arrangements, if one or more entities in the examples 345 are synonyms of entities already contained in the entities 552, the data processing system 115, or the AI system(s) 125, can modify the entities 552 in the merged problem-solution data set 510 to replace the synonyms with the terms for the entities identified in the examples 345 corresponding to the selected intent 340.

Referring again to decision box 430, if there is not an intent 550 from the merged problem-solution data set 510 that is similar to (or the same as) the selected intent 340, the process can proceed to step 440. At step 440 the data processing system 115, or the AI system(s) 125, can automatically add the selected intent 340 to the intents 550 of the merged problem-solution data set 510. Also, from the selected intent 340 and examples 345 corresponding to the selected intent 340, the data processing system 115, or the AI system(s) 125, can identify entities corresponding to the selected intent 340 and add those entities to the entities 552 of the merged problem-solution data set 510.

The process can proceed from step 435 or step 440 to decision box 445. At decision box 445, the data processing system 115, or the AI system(s) 125, can determine whether there is a next intent 340 in the intents 340 that has not yet been selected. If so, at step 450 the data processing system 115 can select a next intent 340 that has not yet been selected. The process can return to step 425 and reiterate until there are no further intents 340 that have not already been selected during the present process.

Responsive to the data processing system 115 determining that there are no further intents 340 that have not already been selected during the present process, the process can proceed to step 455. At step 455 the data processing system 115, or the AI system(s) 125, can modify the existing dialogs 364 using the generated dialogs 354. Modifying the existing dialogs 364 can include adding a new dialog to the existing dialogs 364 from the generated dialogs 354 and/or changing a dialog in the existing dialogs 364 based on the generated dialogs 354, for example as previously described for steps 235 and 240 of FIG. 2. The process can end at step 460.

Referring to FIG. 5, a system developer can provide further modifications 570 to the intents 500, entities 552 and existing dialogs 364 of the merged problem-solution data set 510, for example to manually modify the first problem-solution data set 510.

Figure 6:
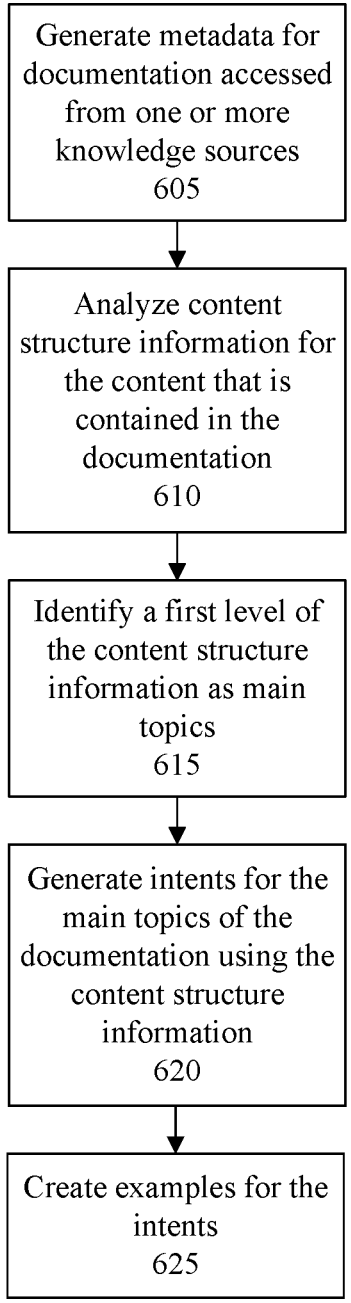
FIG. 6 is a flowchart illustrating an example of a method of automatically translating data from a knowledge source to intents and examples.

FIG. 6 is a flowchart illustrating an example of a method 600 of automatically translating data from a knowledge source to intents and examples. The method 600 can be implemented at step 210 of FIG. 2 and/or at step 410 of FIG. 4.

At step 605 the data processing system 115, or the AI system(s) 125, can generate metadata for documentation received as data 130 from the knowledge sources 120. The metadata can describe the documentation. For example, the AI system(s) 125 can generate metadata for each page of the documentation and add to each page of the documentation metadata generated for that page. The metadata added to each page of the documentation can describe the content on that page, for example, using a chatbot language.

Figure 7:
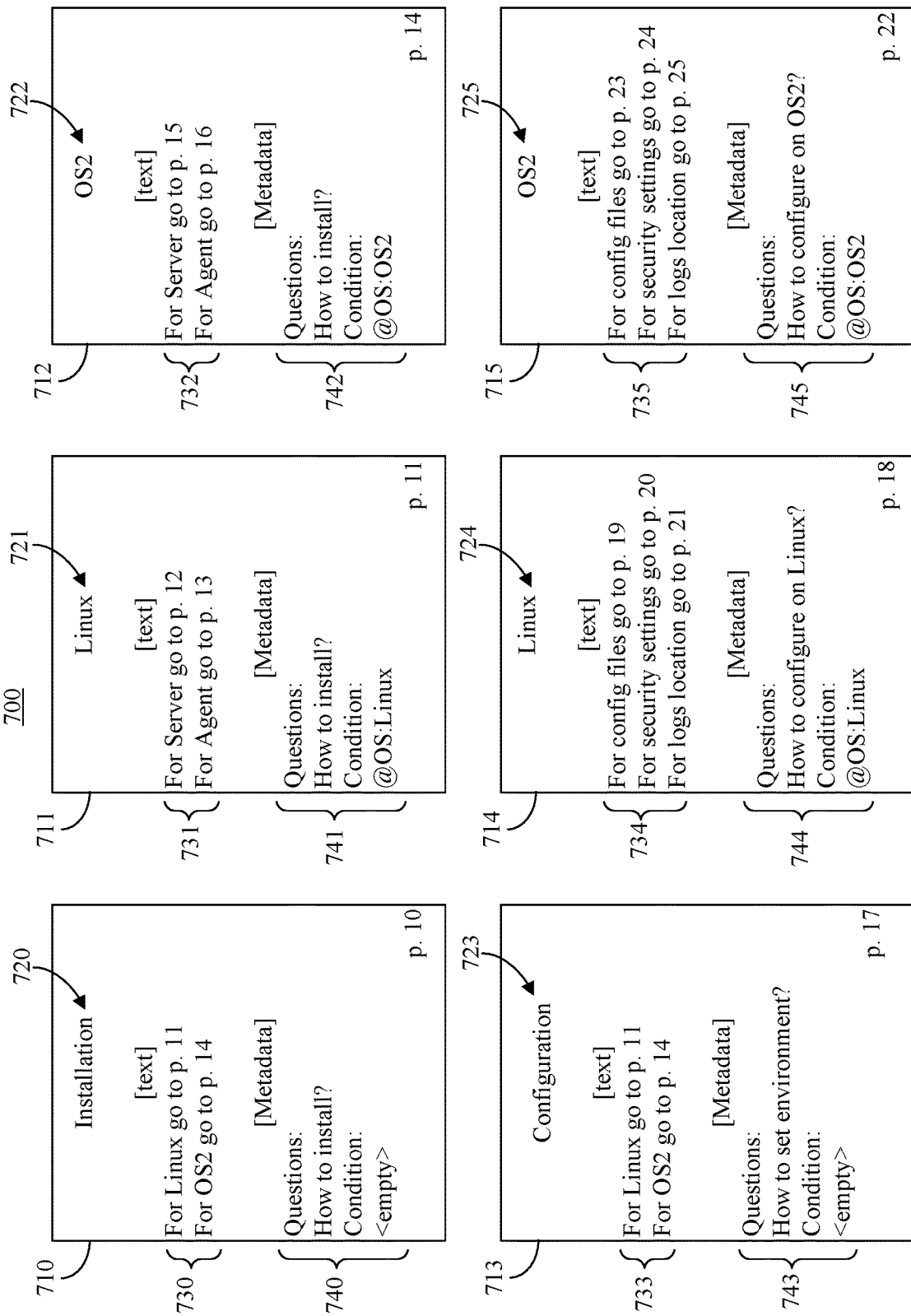
FIG. 7 depicts examples of metadata added to documentation.

FIG. 7 depicts examples of metadata added to documentation 700 by the data processing system 115 or the AI system(s) 125. In illustration, one or more pages 710, 711, 712, 713, 714, 715 of the documentation 700 can include a respective heading 720, 721, 722, 723, 724, 725. The pages 710-715 of the documentation also can include respective content 730, 731, 732, 733, 734, 735. The content 730-735 can include, for example, text. For each page 710-715, the data processing system 115 or the AI system(s) 125, can analyze the heading 720-725 (if a heading is provided on that page 710-715) and the content 730-735 provided for that page. Based on the analysis, the data processing system 115 or the AI system(s) 125, can determine user questions that are addressed (e.g., answered) by that page 710-715 of the documentation and conditions that apply to the questions, if any. The data processing system 115 or the AI system(s) 125, can add the determined questions and conditions, if any, to the respective pages 710-715 as metadata 740, 741, 742, 743, 744, 745. The conditions can provide context for the answers provided in the content 730-735. For instance, the conditions can indicate entities related to questions, and/or other information related to questions, to which the answers apply.

To generate the metadata 740-745 for each page 710-715, the data processing system 115, or the AI system(s) 125, can parse content of the page and analyze heading 720-725 (if any) and the content 730-735 for that page using NLP and semantic analysis, for example by identifying key terms and context in which the key terms are used in the content. Based on the NLP and semantic analysis, the data processing system 115, or the AI system(s) 125, can determine the topic(s) discussed on the page 710-715. Using AI, the data processing system 115, or the AI system(s) 125, can generate one or more questions answered, at least in part, by the heading 720-725 (if any) and the content 730-735. Further, using AI, the data processing system 115, or the AI system(s) 125, can generate one or more conditions to which the generated question(s) apply. The data processing system 115, or the AI system(s) 125, can add the question(s) and condition(s), if any, to the page 710-715 as the metadata 740-745. For example, the AI system(s) 125 can generate the questions and conditions using a conversation engine, for example IBM Watson's conversation engine.

In one or more non-limiting arrangements, the data processing system 115, or the AI system(s) 125, can access from the CSDDS 140 example questions and example conditions. Using AI, the data processing system 115, or the AI system(s) 125, can generate the one or more questions by semantically manipulating the example questions to add to the example questions key terms identified for the respective page 710-715 and/or to replace terms in the example questions with the key terms identified for the respective page 710-715, for example in a heading 720-725 and/or content 730-735. Similarly, using AI, the data processing system 115, or the AI system(s) 125, can generate the one or more conditions by semantically manipulating the example conditions to add to the example conditions key terms identified for the respective page 710-715 and/or to replace terms in the example conditions with the key terms identified for the respective page 710-715, for example in a heading 720-725 and/or content 730-735.

At this point it should be noted that certain headings 720-725 may apply to content 730-735 contained in multiple pages of the documentation 700. For example, the heading 721 may apply to content 731 on the page 711 (page 11), as well as content on pages 12 and 13 (not shown). Based on the structure of the documentation 700, the data processing system 115, or the AI system(s) 125, can determine the content 730-735 to which each heading 720-725 applies, even if such content 730-735 is not on the same page as the heading 720-735. For example, the data processing system 115, or the AI system(s) 125, can analyze a content structure information 800 (FIG. 8) for the documentation 700.

Referring again to FIG. 6, step 610 the data processing system 115, or the AI system(s) 125, can analyze content structure information for the content that is contained in the documentation. FIG. 8 depicts an example of content structure information 800 for the documentation 700, which the AI system(s) 125, can analyze. In this example, the content structure information 800 can be a table of contents for the documentation 700, but the present arrangements are not limited in this regard. Indeed, the content structure information 800 can be formatted in any manner suitable for indicating the content structure of the documentation 700, for example using a data table or other suitable data structure. As part of the analysis, the data processing system 115, or the AI system(s) 125, can create links between entries 810 in the content structure information 800 and pages 710-715 of the documentation 700 to which the entries 810 correspond.

At step 615 the data processing system 115, or the AI system(s) 125, can identify a first level of the content structure information 800 as main topics. For example, the data processing system 115, or the AI system(s) 125, can identify entries 820, 822 as being the first level of the content structure information 800, and identify those entries 820, 822 as main topics.

At step 620 the data processing system 115, or the AI system(s) 125, can generate intents 340 (FIGS. 3 and 5) for the main topics of the documentation 700 using the content structure information 800. The main topics can be portions of the documentation 700 pertaining to the entries 820, 822 identified as the main topics of the documentation 700. By way of Example, the AI system(s) 125 can generate the intents using a conversation engine, for example IBM Watson's conversation engine. In one or more arrangements, the intents can be added to intent containers used by the data processing system 115, or the AI system(s) 125, to train one or more chatbots using machine learning.

FIG. 9 depicts examples of intent containers 900, 902 created for main dialogs. Each intent container 900, 902 can include a respective intent 910, 912, which is a member of the intents 340, corresponding to the main topic of the documentation 700 to which the intent container 900, 902 corresponds. For example, the intent 910 can correspond the entry 820 and the intent 912 can correspond to the entry 822.

At step 625 the data processing system 115, or the AI system(s) 125, can create examples 345 (FIGS. 3 and 5) for each of the intents 910, 912, for example as examples 920, 922, respectively. By way of Example, the AI system(s) 125 can generate the examples 920, 922 using a conversation engine, for example IBM Watson's conversation engine. The data processing system 115, or the AI system(s) 125, can add the examples 920, 922 to the respective intent containers 900, 902, thereby creating associations between the examples 920, 922 and the respective intents 910, 912.

The examples 920, 922 can represent, for instance in a chatbot language, questions which a chatbot is to provide answers.

In one or more arrangements, the data processing system 115, or the AI system(s) 125, can generate one or more of the examples 920, 922 using the metadata 740-745 generated for the documentation 700. For example, metadata 740-742 from the pages 710-712 containing to content 730-732 pertaining to installation of software can be used to create the examples 920, and metadata 743-745 from the pages 713-715 containing to content 733-735 pertaining to configuration of software can be used to create the examples 922. Such metadata 740-745 can be identified using the previously described links created between to the content structure information 800 and the pages 710-715 of the documentation 700 to which the entries 810 correspond.

To generate the examples 920, 922, for example, the data processing system 115, or the AI system(s) 125, can access examples from the CSDDS 140. Using AI, the data processing system 115, or the AI system(s) 125, can generate the examples 920, 922 by semantically analyzing the metadata 740-745 and the examples accessed from the CSDDS 140 and determining equivalencies between the metadata 740-745 and the examples accessed from the CSDDS 140. Terms (e.g., keywords) in the metadata 740-745 that are semantically equivalent to the examples accessed from the CSDDS 140 can be used to create the examples 920, 922. For example, referring to the metadata 741 of FIG. 7, the keywords "install" in the question "how to install?" and the keyword "Linux" in the condition "@OS:Linux" can be identified as being semantically equivalent to terms "install" and "OS" in a CSDDS example "install on OS." Thus, the keywords "install" and "Linux" from the metadata 741 can be grouped together in the same manner as the CSDDS terms "install" and "OS" to form an example 920 "install on linux."

FIG. 10 is a flowchart illustrating an example of a method 1000 of automatically generating dialogs to add to a problem-solution data set or to modify a problem solution data set. For example, the method 1000 can be used to automatically generate the generated dialogs 354 of the second problem-solution data set 135 or the merged problem-solution data set 510. The method 1000 can be implemented at step 215 of FIG. 2 and/or step 415 of FIG. 4.

Figure 11:
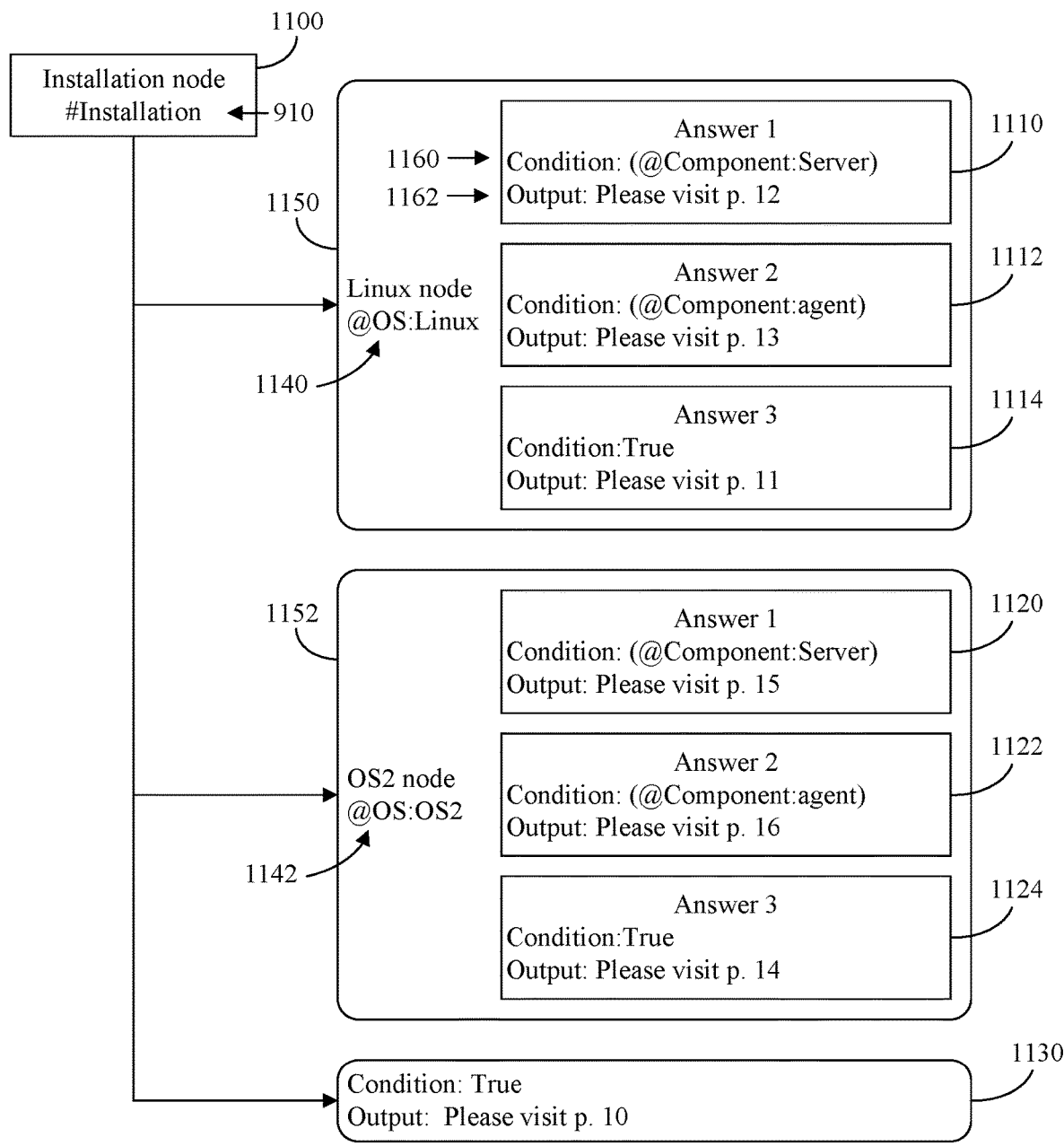
FIG. 11 depicts an example of a dialog.
Figure 12:
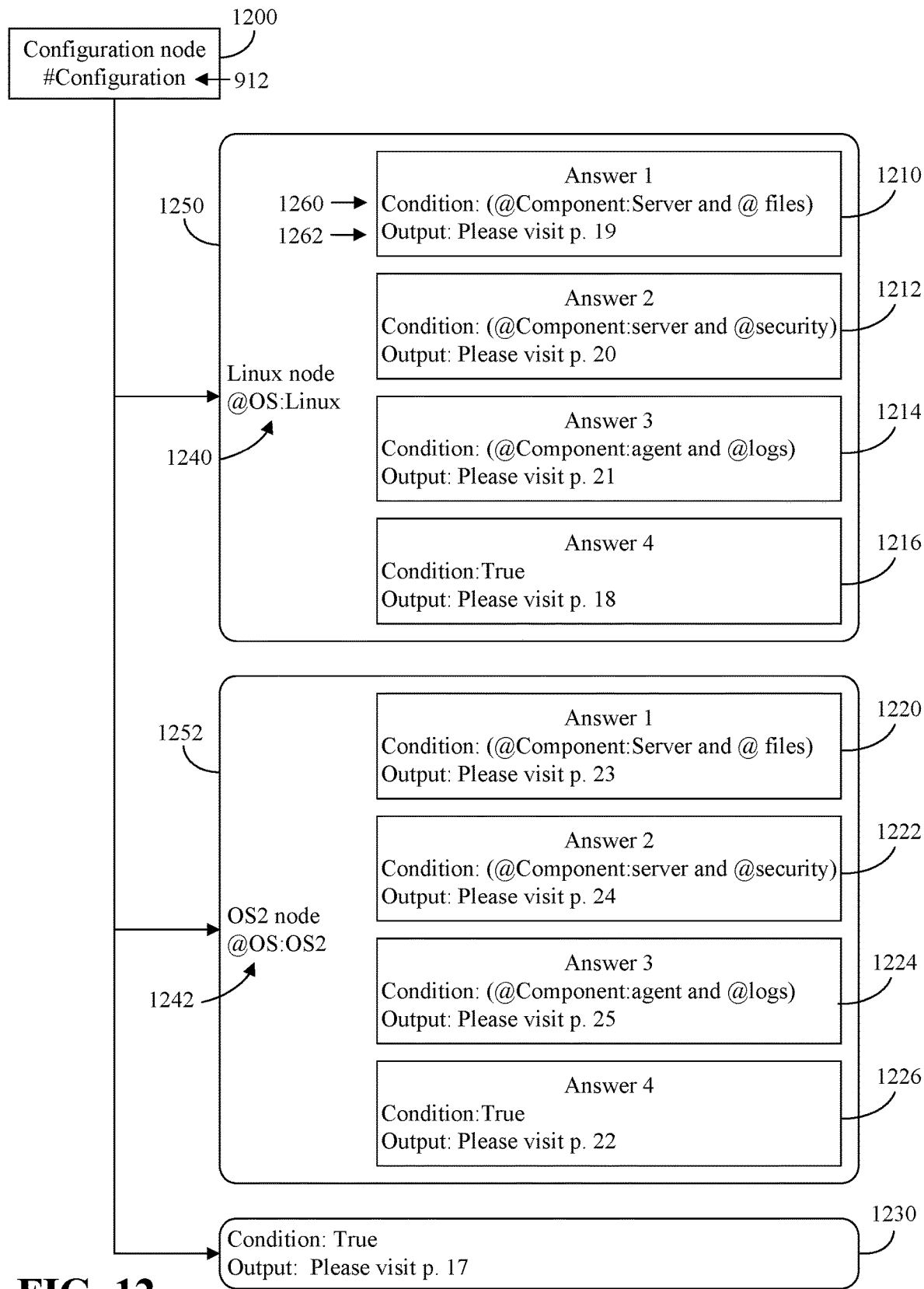
FIG. 12 depicts an example of another dialog

At step 1005 the data processing system 115, or the AI system(s) 125, can generate a respective dialog 354 for each of the respective intents generated for the main dialogs contained in the documentation 700. FIG. 11 depicts an example of a dialog 1100, which can be one of the dialogs 354 created for a first intent, and FIG. 12 depicts an example of a dialog 1200, which can be a dialog 354 created for a second intent. In these examples, the dialog 1100 can be created for the intent 910 and the dialog 1200 can be created for the intent 912. Each dialog 1100, 1200 can be a node in a problem-solution data set, for example the second problem-solution data set 135 (FIGS. 1 and 3) or the merged problem-solution data set 510. Each dialog 1100, 1200 can indicate the respective intent 910, 912 for which it is created.

At step 1010 the data processing system 115, or the AI system(s) 125, can create sub-dialogs for each of the dialogs. For example, referring to FIG. 11, the data processing system 115, or the AI system(s) 125, can create sub-dialogs 1110, 1112, 1114, 1120, 1122, 1124, 1130 for the dialog 1100. The sub-dialogs 110-1130 can apply to the intent 910 for which the dialog 1100 is created. Referring to FIG. 12, the data processing system 115, or the AI system(s) 125, can create sub-dialogs 1210, 1212, 1214, 1216, 1220, 1222, 1224, 1226, 1230 for the dialog 1200. The sub-dialogs 1210-1230 can apply to the intent 912 for which the dialog 1200 is created. In one or more non-limiting arrangements, each sub-dialog 1110-1130 can be created based, at least in part, on one or more of the examples 920. Similarly, each of the sub-dialogs 1210-1230 can be created based, at least on part, on one or more of the examples 922.

For example, each of the sub-dialogs 1110-1130, 1210-1230 can specify, as an output, an answer at least one question represented by one or more of the examples 920, 922. The answers can be the answers, contained in the content 730-735, that correspond to the questions represented by the examples 820, 822. In one or more arrangements, the answers can be configured in a chatbot language.

The data processing system 115, or the AI system(s) 125, can arrange the sub-dialogs 1110-1130, 1210-1230 into groups, for example based on a condition to which each sub-dialog applies. In illustration, if the sub-dialogs 1110-1114 each apply to a condition 1140 @OS:Linux, the sub-dialogs 1110-1114 can be assigned to a sub-dialog group 1150 created by the data processing system 115, or the AI system(s) 125, for that condition 1140 in the dialog 1100. If the sub-dialogs 1120-1124 each apply to a condition 1142 @OS:OS2, the sub-dialogs 1120-1124 can be assigned to a sub-dialog group 1152 created by the data processing system 115, or the AI system(s) 125, for that condition 1142 in the dialog 1100. In this example, the sub-dialog 1130 does not apply to a condition 1140, 1142 to which the other sub-dialogs 1110-1124 apply, and thus need not be assigned to a sub-dialog group 1150, 1152.

Similarly, if the sub-dialogs 1210-1216 each apply to a condition 1240 @OS:Linux, the sub-dialogs 1210-1216 can be assigned to a sub-dialog group 1250 created by the data processing system 115, or the AI system(s) 125, for that condition 1240 in the dialog 1200. If the sub-dialogs 1220-1226 each apply to a condition 1242 @OS:OS2, the sub-dialogs 1220-1226 can be assigned to a sub-dialog group 1252 created by the data processing system 115, or the AI system(s) 125, for that condition 1242 in the dialog 1200. In this example, the sub-dialog 1230 does not apply to a condition 1240, 1242 to which the other sub-dialogs 1210-1226 apply, and thus need not be assigned to a sub-dialog group 1250, 1252.

Each sub-dialog 1110-1130, 1210-1230 can inherit conditions 1140, 1142, 1240, 1242 for the sub-dialog group 1150, 1152, 1250, 1252 to which the sub-dialog 1110-1130, 1210-1230 is assigned. Further, in an arrangement in which sub-dialogs 1110-1130, 1210-1230 are arranged in a hierarchical manner, each sub-dialog 1110-1130, 1210-1230 can inherit conditions from all of its parents all the way up to the dialogs 1100, 1200.

Each sub-dialog 1110-1130, 1210-1230 can specify one or more further conditions to which it applies and specify an output. For example, the dialog 1110 can specify one or more further conditions 1160 and an output 1162 and the dialog 1210 can specify one or more further conditions 1260 and an output 1262. The dialogs 1112-1130, 1212-1230 can be configured in a similar manner.

The data processing system 115, or the AI system(s) 125, can create the dialogs 1100, 1200 based on the analysis of the content structure information 800 (FIG. 8) for the documentation 700 and based on the intents 910, 912 (e.g., the intent containers 900, 902). For example, each sub-dialog 1110-1130, 1210-1230 can specify one or more conditions contained in metadata 740-745 on a particular page 710-715, or sequential pages 710-715, of the documentation 700, and specify as an output that page or those pages, or provide links to the page(s). Such page(s) can contain, one or more answers to questions. For those sub-dialogs 1110-1130, 1210-1230 assigned to sub-dialog groups 1150, 1152, 1250, 1252, the particular page 710-715, or sequential pages 710-715, also can contain metadata 740-745 including the conditions 1140, 1142, 1240, 1242 for the respective sub-dialog groups 1150, 1152, 1250, 1252 to which the sub-dialogs 1110-1130, 1210-1230 are assigned. The data processing system 115, or the AI system(s) 125, can determine the pages 710-715 using the content structure information 800 and determine the metadata 740-745 using the previously described links created between the content structure information 800 and the pages 710-715 where the metadata 740-745 has been added.

The generated dialogs 1100, 1200 can be used to modify existing dialogs 365, for example as previously described with reference to FIGS. 2-5.

Figure 13:
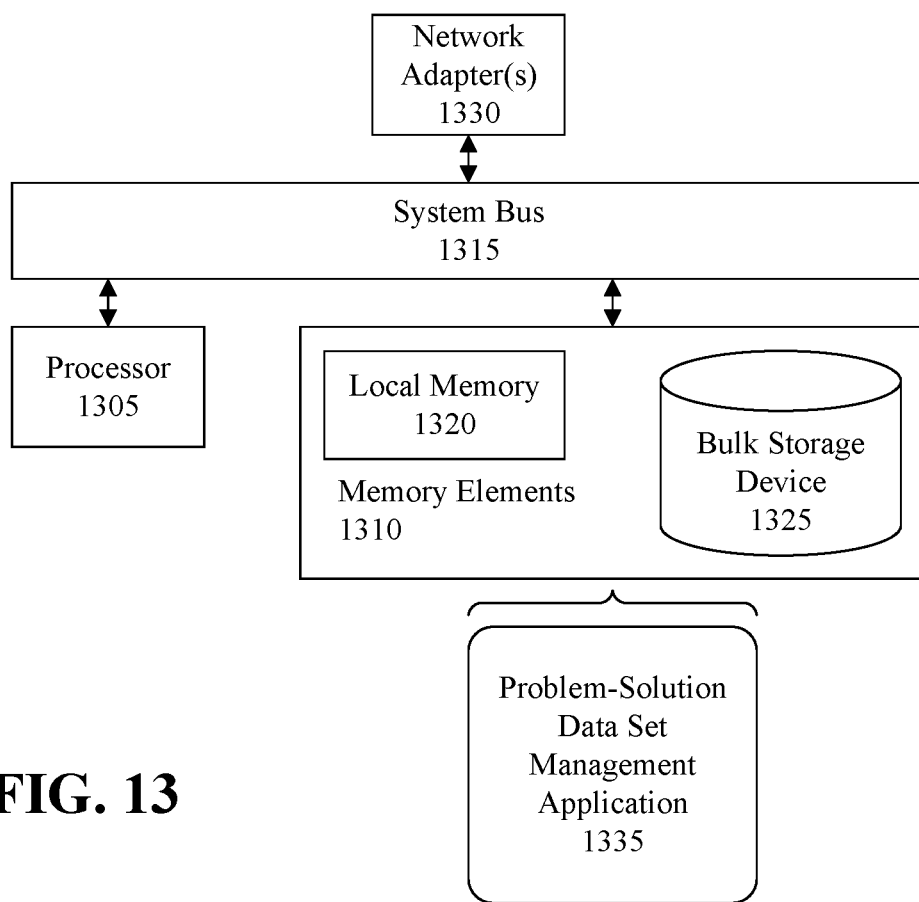
FIG. 13 is a block diagram illustrating example architecture for a data processing system

FIG. 13 is a block diagram illustrating example architecture for the data processing system 115. The data processing system 115 can include at least one processor 1305 (e.g., a central processing unit) coupled to memory elements 1310 through a system bus 1315 or other suitable circuitry. As such, the data processing system 115 can store program code within the memory elements 1310. The processor 1305 can execute the program code accessed from the memory elements 1310 via the system bus 1315. It should be appreciated that the data processing system 115 can be implemented in the form of any system including a processor and memory that is capable of performing the functions and/or operations described within this specification. For example, the data processing system 115 can be implemented as a server, a plurality of communicatively linked servers, a workstation, a desktop computer, a mobile computer, a tablet computer, a laptop computer, a netbook computer, a smart phone, and so on.

The memory elements 1310 can include one or more physical memory devices such as, for example, local memory 1320 and one or more bulk storage devices 1325. Local memory 1320 refers to random access memory (RAM) or other non-persistent memory device(s) generally used during actual execution of the program code. The bulk storage device(s) 1325 can be implemented as a hard disk drive (HDD), solid state drive (SSD), or other persistent data storage device. The data processing system 115 also can include one or more cache memories (not shown) that provide temporary storage of at least some program code in order to reduce the number of times program code must be retrieved from the local memory 1320 and/or bulk storage device 1325 during execution.

One or more network adapters 1330 can be coupled to data processing system 115 to enable the data processing system 115 to become coupled to other systems, computer systems, remote printers, and/or remote storage devices through intervening private or public networks. Modems, cable modems, transceivers, and Ethernet cards are examples of different types of network adapters 1330 that can be used with the data processing system 115.

As pictured in FIG. 13, the memory elements 1310 can store the components of the data processing system 115, namely a problem-solution data set management application 1335 configured to perform the processes described herein as being performed by the data processing system 115. Being implemented in the form of executable program code, the problem-solution data set management application 1335 can be executed by the data processing system 115 and, as such, can be considered part of the data processing system 115. Moreover, the problem-solution data set management application 1335 is a functional data structure that imparts functionality when employed as part of the data processing system 115. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect,"

"an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   accessing a plurality of pages of documentation from at least one knowledge source;
   generating first metadata describing content of respective ones of the plurality of pages of the documentation;
   generating, using a processor, a set of first intents for main topics of the documentation using content structure information for the documentation, wherein the generating the set of first intents comprises identifying, using an artificial intelligence (AI) system, intents and entities based on information provided in the respective ones of the plurality of pages of the documentation, and wherein the AI system is trained using machine learning to identify the intents and the entities;
   generating dialogs for the set of first intents;
   creating sub-dialogs for each of the generated dialogs for the set of first intents based, at least in part, on the first metadata;
   determining, for a first intent of the set of first intents, whether there is a second intent, from an existing problem-solution data set used as a chatbot workspace, that is a same as or similar to the first intent;
   responsive to determining that the second intent, from the existing problem-solution data set used as the chatbot workspace, is not the same as or similar to the first intent, adding to existing dialogs of the existing problem-solution data set the generated dialogs for the set of first intents and the sub-dialogs created for each of the generated dialogs for the set of first intents; and
   generating a user conversation based on the existing problem-solution set using a chatbot, wherein the chatbot is trained using the AI system based at least in part on the intents.

2. The method of claim 1, further comprising:
   creating examples for the intents, wherein the examples represent questions to which answers are to be provided by the sub-dialogs;
   wherein the creating the sub-dialogs further is based, at least in part, on the examples created for the intents.

3. The method of claim 2, wherein the sub-dialogs specify as output the answers to the questions.

4. The method of claim 3, wherein at least a portion of the sub-dialogs further specify conditions that provide context to the answers.

5. The method of claim 4, wherein the sub-dialogs inherit conditions from sub-dialog groups to which the sub-dialogs are assigned.

6. The method of claim 3, further comprising:
   adding to the respective ones of the plurality of pages of the documentation a corresponding second metadata, the sub-dialogs comprising the questions and the answers addressed by the respective ones of the plurality of pages of the documentation.

7. The method of claim 1, further comprising:
   identifying a first level of the content structure information as the main topics of the documentation.

8. A system, comprising:
   one or more processors; and
   one or more memory devices coupled to the one or more processors, wherein the one or more processors are configured to:
   access a plurality of pages of documentation from at least one knowledge source;
   generate first metadata describing content of respective ones of the plurality of pages of the documentation;
   generate a set of first intents for main topics of the documentation using content structure information for the documentation, wherein the generating the set of first intents comprises identifying, using an artificial intelligence (AI) system, intents and entities based on information provided in the respective ones of the plurality of pages of the documentation, and wherein the AI system is trained using machine learning to identify the intents and the entities;
   generate dialogs for the set of first intents;
   create sub-dialogs for each of the generated dialogs for the set of first intents based, at least in part, on the first metadata;
   determine, for a first intent of the set of first intents, whether there is a second intent, from an existing problem-solution data set used as a chatbot workspace, that is a same or similar to the first intent;
   responsive to determining that the second intent, from the existing problem-solution data set used as the chatbot workspace, is not the same as or similar to the first intent, add to existing dialogs of the existing problem-solution data set the generated dialogs for the set of first intents and the sub-dialogs created for each of the generated dialogs for the set of first intents; and generate a user conversation based on the existing problem-solution set using a chatbot, wherein the chatbot is trained using the AI system based at least in part on the intents.

9. The system of claim 8, wherein the one or more processors are further configured to:
create examples for the intents, wherein the examples represent questions to which answers are to be provided by the sub-dialogs,
wherein the creating the sub-dialogs further is based, at least in part, on the examples created for the intents.

10. The system of claim 9, wherein the sub-dialogs specify as output the answers to the questions.

11. The system of claim 10, wherein at least a portion of the sub-dialogs further specify conditions that provide context to the answers.

12. The system of claim 11, wherein the sub-dialogs inherit conditions from sub-dialog groups to which the sub-dialogs are assigned.

13. The system of claim 10, wherein the one or more processors are further configured to:
add to the respective ones of the plurality of pages of the documentation second metadata, the sub-dialogs comprising the questions and the answers addressed by the respective ones of the plurality of pages of the documentation.

14. The system of claim 8, wherein the one or more processors are further configured to:
identify a first level of the content structure information as the main topics of the documentation.

15. A non-transitory computer-readable medium storing a set of instructions for wireless communication, the set of instructions comprising:
one or more instructions that, when executed by one or more processors of a device, cause the device to:
access a plurality of pages of documentation from at least one knowledge source;
generate first metadata describing content of respective ones of the plurality of pages of the documentation;
generate a set of first intents for main topics of the documentation using content structure information for the documentation, wherein the generating the set of first intents comprises identifying, using an artificial intelligence (AI) system, intents and entities based on information provided in the respective ones of the plurality of pages of the documentation, and wherein the AI system is trained using machine learning to identify the intents and the entities;
generate dialogs for the set of first intents;
creating sub-dialogs for each of the generated dialogs for the set of first intents based, at least in part, on the first metadata;
determine, for a first intent of the set of first intents, whether there is a second intent, from an existing problem-solution data set used as a chatbot workspace, that is a same or similar to the first intent;
responsive to determining that the second intent, from the existing problem-solution data set used as the chatbot workspace, is not the same as or similar to the first intent, add to existing dialogs of the existing problem-solution data set the generated dialogs for the set of first intents and the sub-dialogs created for each of the generated dialogs for the set of first intents; and
generate a user conversation based on the existing problem-solution set using a chatbot, wherein the chatbot is trained using the AI system based at least in part on the intents.

16. The non-transitory computer-readable medium of claim 15, wherein the wherein the one or more instructions cause the device to:
create examples for the intents, wherein the examples represent questions to which answers are to be provided by the sub-dialogs,
wherein the creating the sub-dialogs further is based, at least in part, on the examples created for the intents.

17. The non-transitory computer-readable medium of claim 16, wherein the sub-dialogs specify as output the answers to the questions.

18. The non-transitory computer-readable medium of claim 17, wherein at least a portion of the sub-dialogs further specify conditions that provide context to the answers.

19. The non-transitory computer-readable medium of claim 18, wherein the sub-dialogs inherit conditions from sub-dialog groups to which the sub-dialogs are assigned.

20. The non-transitory computer-readable medium of claim 17, wherein the wherein the one or more instructions cause the device to:
add to the respective ones of the plurality of pages of the documentation a corresponding second metadata, the sub-dialogs comprising the questions and the answers addressed by the respective ones of the plurality of pages of the documentation.

* * * * *